Patented July 7, 1942

2,288,702

UNITED STATES PATENT OFFICE 2,288,702

CAPILLARY ACTIVE AGENTS

Winfrid Hentrich, Dusseldorf-Reisholz, and Alfred Kirstahler, Dessau, Anhalt, Germany, assignors, by mesne assignments, to "Unichem" Chemikalien Handels A.-G., Zurich, Switzerland, a corporation of Switzerland No Drawing. Application July 7, 1938, Serial No. 217,951. In Germany July 10, 1937

13 Claims. (Cl. 260—512)

Method for the production of capillary active stuffs.

It has been found that valuable capillary active stuffs are obtainable in condensing with halogen-alkyl-aryl-sulfonic acids, organic hydroxyl-compounds of the general formula R-Ar-OH, where the radical R means at least one residue containing no less than 3 carbon atoms, and the radical Ar an aromatic residue.

In the general formula R-Ar-OH the radical R represents one or several aliphatic, cycloaliphatic or hydro-aromatic residues. As aliphatic residues there are to be considered e. g. propyl-, amyl-, octyl-, dodecyl-, hexadecyl-residues etc. or ramified residues such as the isopropyl-, the various isohexyl-, isodecyl-, isotetradecyl-residues and the like or, respectively, residues with tertiary carbon atoms such as the tertiary butyl-, tertiary amyl-, di-isobutyl-, tri-isobutyl-, tertiary ethyl-hexyl-residue. As cycloaliphatic or hydro-aromatic residues there are e. g. the cyclohexyl- or alkyl-cyclohexyl residues respectively, the tetrahydro- and deka-hydronaphthyl residue, the benzyl-, menaphthyl- and tetrahydro-menaphthyl residue. The residues represented by the radical R may also contain other known atoms or atom groups such as halogen, oxygen, sulfur or nitrogen or their well known combinations.

Radical Ar means an aromatic residue such as the residue of the benzol, toluol, xylol, naphthalin, phenanthren, enthracene, diphenyl, diphenyl-ethane, diphenyl-methane, phenyl-naphthyl-methane and the like. Those residues may on their part be substituted by hydrocarbon residues of any kind such as methyl- or ethyl-groups either directly or over an oxygen- or sulfur-atom. They may, moreover, contain halogen-, hydroxyl-, nitrogen-groups and the like when serving as substituents.

The organic hydroxyl-compounds of the general formula R-Ar-OH are obtainable by the condensation of primary, secondary or tertiary alcohols or their mixtures or, respectively, of the olefins corresponding to those alcohols with aromatic components such as phenols, naphthols and the like. The condensation is performed in a way known in itself eventually in using suitable catalysts such as organic acids, metal-halides, boron-fluoride and its additive products, surface-catalysts and the like.

In the production of those hydroxyl-compounds we may apply initial materials which the technic supplies in part on a large scale such as the higher molecular aliphatic alcohols obtainable by the reduction from vegetable, animal or mineral fats or waxes or, respectively, the naphthenic alcohols, the resinic alcohols obtainable by reduction from natural resins and resinic acids, further the pentyl-methyl-carbinol, $\beta$-ethylbutyl-alcohol, $\beta$-ethyl-hexyl-alcohol, $\beta$-butyl-octyl-alcohol, methyl-isobutyl-carbinol, oil of turpentine, pine oil, alcoholic and olefinic products resulting from the carbonization of wood, second runnings from the methanol-synthesis, olefinic products of the lignite-distillation, the cracking of petroleum and paraffins as well as of the benzine-synthesis.

Aromatic hydroxyl-compounds alkylated in the nucleus and with a non-ramified alkyl-chain are also obtainable by esterification of carbonic acids or their derivatives with aromatic hydroxy-compounds, in re-arranging the esters in the well known manner to the corresponding hydroxy-aryl-ketones and eventually in transforming therein the ketone group by reduction to a methylene group.

The halogen-alkyl-aryl-sulfonic acids applied according to the present invention for the converting with the organic hydroxyl-compounds correspond to the general formula Hal-R'-Ar'-$(SO_3H)_n$, where Hal means at least one halogen atom, R' an alkylene residue which may also contain further groups, e. g., a CO-group; Ar' an aromatic residue which may also be substituted by groups such as hydrocarbon residues, halogen-groups, hydroxyl-groups, ether groups and the like, and $n$ the number 1 or also a higher number. Among the compounds of the kind applicable for the present method there may be mentioned, e. g., benzyl-chloride-o-sulfonic acid, benzyl-chloride-p-sulfonic acid, tolyl-chloride-sulfonic acid, menaphthyl-chloride sulfonic acids, $\omega$-chloro-acetophenone-p-sulfonic acid and the like. These halogen-alkyl-aryl-sulfonic acids are obtained in well known ways, e. g., by direct reaction of the halogens upon alkyl-aryl-sulfonic salts.

The transposition between the organic hydroxyl-compounds of the general formula R-Ar-OH and the halogen-alkyl-aryl-sulfonic acids is performed in a way known in itself, i. e., in converting metal-compounds of the hydroxyl-compounds with salts of the halogen-alkyl-aryl-sulfonic acids while precipitating the metal halides and in separating the reaction product, if so desired, from the precipitated metal-halides.

The products obtained according to the present invention may eventually be subjected to a treatment with hydrogen in the presence of suitable hydrogenizing catalysts for the saturation of the present aromatic hydrocarbon residues and they possess strongly surface-active properties; they are technically applicable e. g. in the washing means-, textile-, leather-, furriery-, paper-industries and the like as wetting-out-, washing-, deterging-, emulsifying- and dispersing-agents.

*Example 1*

228 weight parts of the sodium compound of the sec.-octyl-phenol obtainable from 1,2-octene and phenol in the presence of suitable condensing agents, and 228 weight parts of benzyl-chloride-p-sulfonic acid sodium are heated in a benzene-solution at the reflux-cooler, while vigorously stirring till the precipitation of the sodium-chloride formed during the condensation is finished. After separating the inorganic salt and after distilling off the solvent there remains the formed sodium salt of the sec.-octyl-phenyl-benzyl ether-4'-sulfonic acid which is soluble in water while in an aqueous solution it shows soap-like properties.

Instead of the iso-octyl-phenolate we may in the present instance likewise apply corresponding amounts of the sodium-compound of a condensation-product obtainable from techn. o-cresol and the non-saturated hydrocarbon portions of a cracking benzine obtained by condensation and in applying the gyro method (average mol. weight 126, iodine number 158, olefin content 78%).

*Example 2*

284 weight parts of tri-isobutyl-phenol-sodium obtainable by the condensation of tri-isobutylene and phenol, and 242 weight parts of tolyl-chloride-sulfonic acid sodium are converted, (as per Example 1), into the sodium salt of (tri-isobutyl-phenyl)-(methyl-benzyl)-ether-sulfonic acids, the aqueous solutions of which show also soaplike properties.

*Example 3*

250 weight parts of the sodium compound of a mixture of isoalkyl-cresols obtained by condensing techn. cresol and a synthetic hydrocarbon-fraction (containing hydrocarbons with 6 to 14 C atoms, average mol. weight 107, iodine number 84), which fraction is obtained from carbon-monoxide and hydrogen, and 228 weight parts of benzyl-chloride-4-sulfonic sodium are heated in deca-hydronaphthalene for several hours at the reflux-cooler while vigorously stirring. The precipitated sodium-chloride is separated off and the thus formed mixture of the sodium salts of the (isoalkyl-methyl-phenyl)-benzyl-ether-4'-sulfonic acids is isolated in the usual way.

We claim:

1. The method of producing capillary-active compounds comprising condensing an organic hydroxyl compound of the general formula R—Ar—OH, in which R is a hydrocarbon group of at least six carbon atoms and Ar is an aromatic group with a halogen-alkylarylsulfonic acid.

2. The method of producing capillary-active compounds comprising condensing an organic hydroxyl compound of the general formula R—Ar—OH, in which R is a hydrocarbon group of at least six carbon atoms and Ar is an aromatic group with benzylchloride-sulfonic acid.

3. A capillary-active compound, a sodium salt of an isoalkyl-methyl-phenyl-benzylether-4'-sulfonic acid, the isoalkyl radical containing from six to fourteen carbon atoms.

4. A capillary active agent, the sodium salt of the sec.octyl-phenyl-benzylether-4'-sulfonic acid.

5. A capillary active agent, the sodium salt of the (triiso-butyl-phenyl)-(methylbenzyl)-ether-sulfonic acid.

6. A capillary active agent, the mixture of the sodium salts of the (isoalkyl-methyl-phenyl)-benzylether-4'-sulfonic acids, the isoalkyl residues corresponding to a synthetic hydrocarbon fraction containing 6 to 14 carbon atoms obtained from carbon-monoxide and hydrogen.

7. A process for the production of capillary-active compounds comprising condensing alkali metal derivatives of organic hydroxyl compounds of the general formula R—Ar—OH, in which R is a hydrocarbon radical of at least six carbon atoms and in which Ar is an aromatic group with a salt of a halogen-alkyl-phenyl sulfonic acid.

8. New capillary-active agents suitable as wetting, washing, cleaning, emulsifying and dispersing agents comprising essentially the alkali metal salts of the sulfonic acids of the general formula R—Ar—O—R'—Ar'—SO$_3$H, wherein R is an alkyl radical of at least six carbon atoms, R' is an alkylene radical and Ar and Ar' are aromatic groups.

9. A process for the production of capillary active compounds comprising condensing a compound selected from the group consisting of organic hydroxyl compounds of the general formula R—Ar—OH and their alkali metal derivatives, in which R is a hydrocarbon radical of at least six carbon atoms, and in which Ar is an aromatic group with a salt of a halogen-alkyl-aryl-sulphonic acid.

10. The method for the production of capillary active compounds comprising condensing an organic hydroxyl compound of the general formula R—Ar—OH, in which R is a hydrocarbon radical of at least six carbon atoms and Ar is an aromatic residue with a halogen-alkyl-aryl-sulphonic acid of the general formula Hal—R'—Ar'(SO$_3$H)$_n$, in which Hal is a halogen atom, R' is an alkylene radical, Ar' is an aromatic residue and $n$ is at least one.

11. New compounds having capillary active properties consisting of hydrocarbon substituted phenyl-benzylether-sulphonic acid salts, said hydrocarbon substituent containing at least six carbon atoms and being joined to the phenyl radical.

12. New compounds having capillary active properties consisting of alkyl-phenyl-benzyl-ether-sulphonic acid salts, said alkyl radical having at least six carbon atoms.

13. A new capillary active compound, an isoalkyl-phenyl-benzylether-sulphonic acid salt, said isoalkyl radical containing at least six carbon atoms.

WINFRID HENTRICH.
ALFRED KIRSTAHLER.